US008280842B2

(12) United States Patent
Roulland et al.

(10) Patent No.: US 8,280,842 B2
(45) Date of Patent: Oct. 2, 2012

(54) COLLABORATIVE LINKING OF SUPPORT KNOWLEDGE BASES WITH VISUALIZATION OF DEVICE

(75) Inventors: Frederic Roulland, Le Versoud (FR); Pascal Valobra, Meylan (FR); Ye Deng, Meylan (FR); Stefania Castellani, Meylan (FR); Jacki O'Neill, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 557 days.

(21) Appl. No.: 12/396,506

(22) Filed: Mar. 3, 2009

(65) Prior Publication Data
US 2010/0229080 A1 Sep. 9, 2010

(51) Int. Cl.
G06F 17/30 (2006.01)
G06F 7/00 (2006.01)
(52) U.S. Cl. .................................... 707/603; 707/755
(58) Field of Classification Search .................. 707/603, 707/755
See application file for complete search history.

(56) References Cited

U.S. PATENT DOCUMENTS

| 6,744,527 | B1 | 6/2004 | Dorsey et al. |
| 6,983,267 | B2 * | 1/2006 | Hamadou et al. ............... 706/59 |
| 2003/0050878 | A1 * | 3/2003 | Rappaport et al. ............. 705/34 |
| 2005/0137843 | A1 | 6/2005 | Lux |
| 2005/0154558 | A1 * | 7/2005 | Baum et al. .................... 702/182 |
| 2006/0197973 | A1 | 9/2006 | Castellani et al. |
| 2007/0192085 | A1 | 8/2007 | Roulland et al. |
| 2008/0091408 | A1 | 4/2008 | Roulland et al. |
| 2008/0294423 | A1 | 11/2008 | Castellani et al. |
| 2009/0198584 | A1 * | 8/2009 | Sorensen et al. ............... 705/26 |
| 2010/0192212 | A1 * | 7/2010 | Raleigh ........................... 726/7 |

OTHER PUBLICATIONS

U.S. Appl. No. 11/875,183, filed Oct. 19, 2007, Roulland, et al.
U.S. Appl. No. 12/126,115, filed May 23, 2008, Castellani, et al.
Liang, et al. "The troubleshooting task implementation in automotive chassis using virtual interactive technique and knowledge-based approach," *Journal of Network and Computer Applications*, Computer Applications 31 (2008), pp. 712-734.
Angeli, et al. "An expert system approach to fault diagnosis in hydraulic systems," Expert Systems, Nov. 1995, vol. 12, No. 4.
Henninger. "Case-Based Knowledge Management Tools for Software Development," Automated Software Engineering 4, (1997), pp. 319-340.
Watson. "Case-based reasoning is a methodology not a technology," Knowledge-Based Systems 12, (1990), pp. 303-308.

* cited by examiner

*Primary Examiner* — Kuen Lu
(74) *Attorney, Agent, or Firm* — Fay Sharpe LLP

(57) ABSTRACT

A system and method which may be implemented at least partly by a computer, are provided for developing a support system. A virtual representation of a device is generated for display on a user interface. Links between components of the virtual representation, which represent components of the device, and corresponding cases in a searchable knowledge base (SKB) are stored. Users can navigate the SKB in search of a solution to a problem with the device with the assistance of the virtual representation which enables actuation of the existing links. The users are able to create new links, each new link linking a component of the virtual representation with a case in the SKB which the user identifies as providing a solution to the problem with the device which is related to the component. The new link is stored for future use by the user or by other users.

22 Claims, 7 Drawing Sheets

| Machine Info | Knowledge Base | Counter |

List of Cases

1. Tray 1,2,3, or 4 Fault Message
2. Please Move Envelope Tray to Tray 1 Position Message
3. Clear Jam in Upper Paper Path and Tray 1 Message
4. Load A4 Paper When Using the Trays 1,2,3, or 4
5. Tray 1,2,3, or 4 Feeds Multiple Sheets of Paper
6. Tray 1,2,3, or 4 Will Not Feed
7. Paper Tray 1,2,3, or 4 Empty Message

Related Solutions

Solutions for case: Tray 1, 2, 3, or 4 Will Not Feed

[1.] Use Paper Within Specification for the Paper tray
[2.] Fan the paper, Turn the Paper Over and Reload the paper Tray
[3.] Remove any Obstructions From the Paper Tray
[4.] Load the Paper Tray With Paper From New Ream
[5.] Adjust the Paper Tray Edges Guides
[6.] Make sure the Correct Feed Roller is being Used With the Type of Paper Loaded in the Paper Tray
[7.] Remove and Re-install the Paper Tray Feed Roll Cartridge for the Paer Tray Being Used
[8.] Replace the Feed Roll Cartridge in the Paper Tray Being Used, and Reset the Feed Roll Counter

*FIG. 4*

COLLABORATIVE LINKING OF SUPPORT KNOWLEDGE BASES WITH VISUALIZATION OF DEVICE

CROSS REFERENCE TO RELATED PATENTS AND APPLICATIONS

The following applications, the disclosures which are incorporated herein in their entireties by reference, are mentioned:

Application Ser. No. 12/126,115, filed May 23, 2008, entitled SYSTEM AND METHOD FOR SEMI-AUTOMATIC CREATION AND MAINTENANCE OF QUERY EXPANSION RULES, by Castellani, et al.; and U.S. application Ser. No. 11/875,183, entitled REAL-TIME QUERY SUGGESTION IN A TROUBLE SHOOTING CONTEXT, filed Oct. 19, 2007, by Roulland, et al.

BACKGROUND

The exemplary embodiment relates to the development of a support system for a device, such as a printer. It finds particular application in connection with a system and method for linking relevant content of a searchable knowledge base with corresponding regions of a visual representation of the device. While the exemplary embodiment is described in terms of a troubleshooting application, it is to be appreciated that the system and method find application in device operation, training, and the like.

Traditionally, users seeking a resolution to problems relating to complex devices, such as printers and computers, often resort to telephoning a service agent for the manufacturer who may seek to diagnose the problem over the telephone. The service agent guides the customer through a troubleshooting sequence that is intended to lead to resolution of the problem or identification of the cause.

More recently, user-operated systems have been made available which provide a user with remote access to a searchable knowledge base (SKB). The SKB may be arranged as a set of problem statements (cases) which describe an observed problem with a device and associated solutions which can resolve at least one cause of the problem. When a user identifies a case which appears to fit the problem, one or more of the corresponding solutions are displayed to the user, as a series of steps to be performed on the device.

The SKB is generally navigated by text searching, either free-text or guided search of a list or hierarchy of textual categories or topics. To make full use of the SKB, the user needs to be able to identify verbally a physical component of the machine, which often has a technical name. Thus, such systems are often better suited to navigation by experts than by a customer seeking to resolve a problem with a machine at its location. However, the process of troubleshooting a device often involves a visual inspection of the device in order to identify the failing component or components. There is therefore often an asymmetry between the way the problem is localized on the device by a customer at the device location and the way the relevant case is retrieved from the SKB.

There remains a need for a system of linking an SKB with a visual representation of the device which assists users lacking expert knowledge in the navigation of the knowledge base.

INCORPORATION BY REFERENCE

The following references, the disclosures of which are incorporated by reference in their entireties, are mentioned:

U.S. Pub. No. 2006/0197973, published Sep. 7, 2006, entitled BI-DIRECTIONAL REMOTE VISUALIZATION FOR SUPPORTING COLLABORATIVE MACHINE TROUBLESHOOTING, by Castellani, et al., discloses a system and method supporting remote interactions between a machine user and a troubleshooting advisor engaged in troubleshooting support activities for a machine. A shared virtual representation of the machine assists a user in implementing an action suggested by the advisor to resolve the troubleshooting need.

U.S. Pub. No. 2008/0294423, published Nov. 27, 2008, entitled INFORMING TROUBLESHOOTING SESSIONS WITH DEVICE DATA, by Castellani, et al. discloses a system and method for troubleshooting a problem with a device which includes acquiring device data for the device, receiving a user's query concerning a device in a natural language, presenting possible refinements to at least a portion of the user's query for defining a problem statement, and presenting candidate solutions that are associated with the defined problem statement in a knowledge base informed by the device data.

U.S. Pub. No. 2007/0192085, published Aug. 16, 2007, entitled NATURAL LANGUAGE PROCESSING FOR DEVELOPING QUERIES, by Roulland, et al., discloses a system suited to self-troubleshooting which includes a processor which identifies normalized forms of at least some of the words of a natural language user query input by a user. The user query may describe a problem experienced with a machine, such as a printer. The processor retrieves text strings which may comprise problem statements stored in memory. Each retrieved problem statement includes at least one word with a normalized form which is recognized by the processor as being equivalent to one of the identified normalized forms. Each of the retrieved problem statements may be associated with at least one solution sequence for addressing the problem with the machine. In the event that the stored problem statements in memory are not fully responsive, the processor provides one or more options for refinement of the user query based on tags associated with those words of the problem statements which are responsive.

U.S. Pub. No. 2005/0137843, published Jun. 23, 2005, entitled METHOD AND APPARATUS FOR AUTHORING DOCUMENTS USING OBJECT-BASED ELEMENTS AS AN INTERACTION INTERFACE, by Lux, discloses an interactive document authoring system having implemented therein structural and linguistic resources including textual elements and a set of rules for combining at least some of the textual elements as a natural language text upon user interaction. An accessible object-based element is associated with the structural and linguistic resources which can be accessed to interact with the document authoring system U.S. Pat. No. 6,744,527, issued Jun. 1, 2004, entitled USER INTERFACE FOR NAVIGATION AND CONTROL OF A PRINTING SYSTEM, by Dorsey, et al., discloses a printer with a user interface including a depiction of a printing system shown on a display screen which includes icons for a feeder, print engine, and finisher, and a display unit displaying operator information of a desired icon on the display screen by selecting the desired icon.

U.S. Pub. No. 2008/0091408, published Apr. 17, 2008, entitled NAVIGATION SYSTEM FOR TEXT, by Roulland, et al., discloses a computer retrieval system including instructions for receiving a user query in a natural language, identifying text strings from an associated knowledge base, each containing at least one expression (word or multi-word expression) which is matched with at least one expression of the user query, and refining the user query by representing at least a group of the text strings as a navigation tree in which each of a plurality of selectable nodes comprises an expression representative of at least one syntactic unit in at least one of the identified text strings and wherein relationships between syntactic units are used in structuring the nodes of the navigation tree. Text is retrieved from the knowledge base related to the refined query.

BRIEF DESCRIPTION

In accordance with one aspect of the exemplary embodiment, a method for developing a support system includes generating a virtual representation of a device for display on a user interface. Existing links between components of the virtual representation, which represent components of the device, and corresponding cases in a searchable knowledge base are stored in computer memory. Provision is made for a user to navigate the knowledge base in search of a solution to a problem with the device with the assistance of the virtual representation which enables actuation of the existing links. Where a link between a component of the virtual representation and a case in the searchable knowledge base does not exist, provision is made for the user to create a new link, each new link linking a component of the virtual representation with a case in the knowledge base which the user identifies as providing a solution to the problem with the device which is related to the component. The new link is stored whereby a user navigating the knowledge base in search of a solution to a problem with a device with the assistance of the virtual representation is able to access the new link.

In another aspect, a support system includes computer memory which stores a 3D device model for generating a virtual representation of a device for display on a user interface, a links database which stores existing links between components of the virtual representation, which represent components of the device, and corresponding cases in an associated knowledge base, and a linking system which enables a user navigating the knowledge base in search of a solution to a problem with the device with the assistance of the virtual representation to create a new link between a component of the virtual representation and a case in the searchable knowledge base where one does not exist. Each new link links a component of the virtual representation with a case in the knowledge base which the user identifies as providing a solution to the problem with the device which is related to the component, the new link being stored in the links database. A processor in communication with the memory implements the linking system.

In another aspect, a computer implemented method for creating new links between a device model and a knowledge base includes causing a virtual representation of a device to be displayed on a user interface, providing actuable links on the virtual representation. When actuated by a user manipulating the user interface, each actuable link links a component of the device model displayed in the virtual representation with at least one case in the knowledge base, and causes at least one of the at least one case to be displayed on the user interface. The method further includes providing for the user to navigate the knowledge base and create a new link by associating a case in the knowledge base with a component of the virtual representation displayed on the user interface.

BRIEF DESCRIPTION OF THE DRAWINGS

FIG. 4 illustrates a screenshot of a three dimensional visualization of the MFD displaying a name of a component and an actuable link to the knowledge base, together with a display of the linked content of the knowledge base;

DETAILED DESCRIPTION

Figure 1:
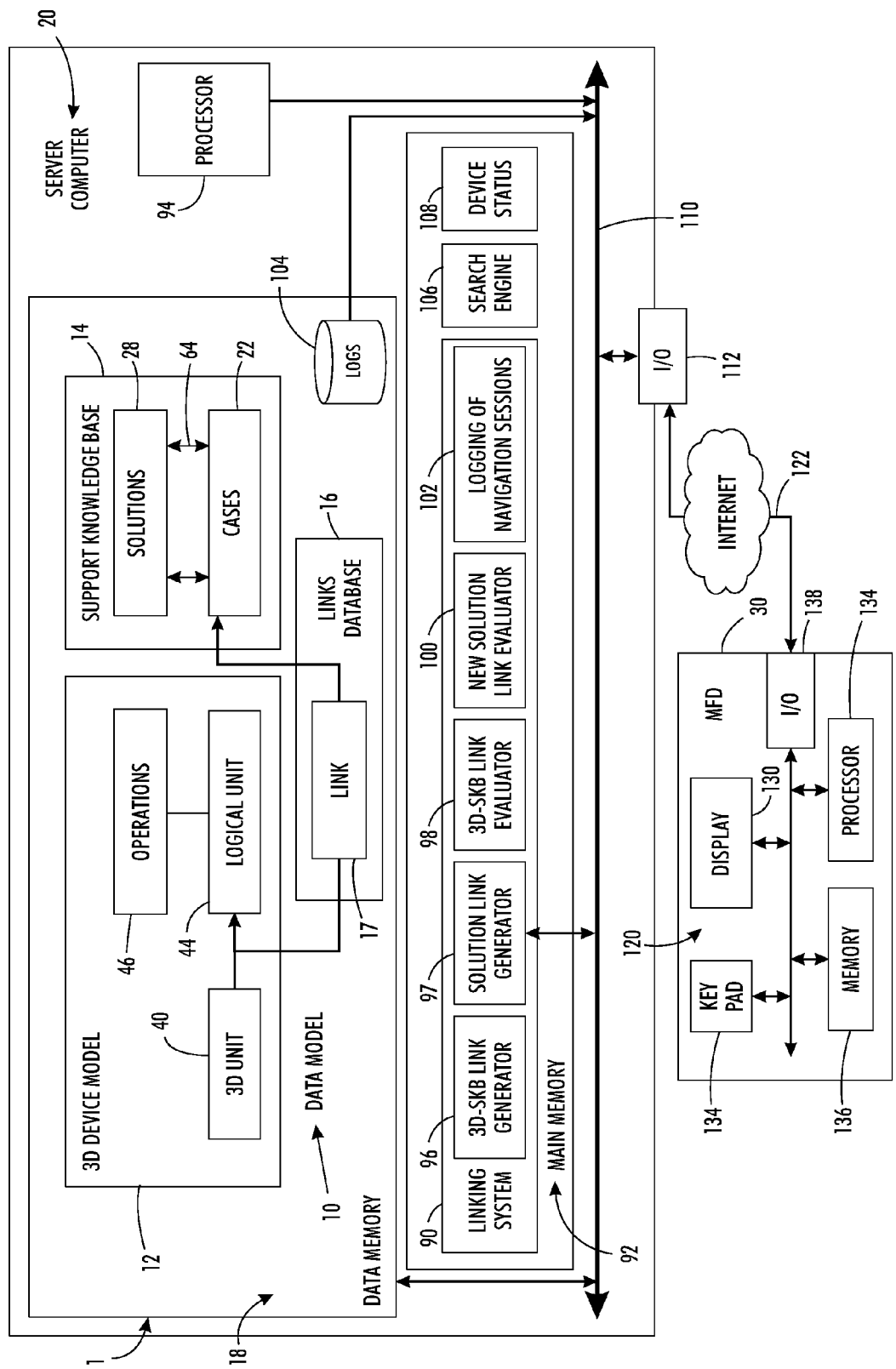
FIG. 1 is a functional block diagram of an environment in which an exemplary support system operates.

Aspects of the exemplary embodiment relate to the development of an interactive support system, such as a troubleshooting system, for assisting a user in identifying solutions to a user query relating to a problem experienced with a machine, such as a printer or computer. As used herein, a "printer" can include any device for rendering an image on print media, such as a copier, laser printer, bookmaking machine, facsimile machine, or a multifunction device having two or more such capabilities. While the exemplary system and method are described in terms of a multifunction device that includes a printer that prints received digital images on print media, it will be appreciated that the system and method are equally applicable to other complex machines with which a user may encounter problems that are not readily solved using the user's general experience of the machine and where the physical structure of the device cam at least partially drive the user navigation activity.

The exemplary support system enables a user to navigate a searchable knowledge base (SKB) containing information and instructions related to the device. The SKB can be any electronic database containing searchable text in a natural language, such as English or French. It may be a structured database. In the specific examples described herein, the SKB includes problem statements (cases), which may each be a short textual description of a known problem with a printer that users may experience, and one or more linked solution statements which describe steps for solving the problem. For example, a problem statement may be the single sentence which describes a problem. In the case of a printer for example, an exemplary problem statement may be "White lines when making copies from the document glass and document feeder." The solutions can each comprise a sequence of one or more steps for a user to perform in attempting to solve the problem. A solution sequence may be composed of at least two parts: a title, which basically describes what needs to be done, and a description, which gives step by step instructions to the user to fix the problem. Since a problem identified by a user may have more than one root cause, problem descriptions in the database may include more than one solution sequence, which may be ordered in a list. Additionally, two or more problem descriptions may be associated with the same solution. The SKB may be indexed according to the content of the problem statements only, or the content of both the problem statements and solutions. For example, the SKB may be indexed according to the normalized forms of the words that occur in the problem descriptions, and optionally also their synonyms. Alternatively, the problem statements may be stored as hypertext documents, such as extensible markup language (XML) documents, which are annotated with tags, which link the problem statements to the associated solutions.

A search engine can be configured for retrieving documents (cases) which include one or more words of a user's query and presenting them to the user in a ranked order. When the user finds a problem statement/solution which addresses a perceived problem, the user may review the proposed solution statement and then end the query session. If the search engine does not retrieve any responsive documents, the user may try another query and so on through several iterations until the user finds what he is looking for and ends the session, or ends the session without doing so.

In the exemplary embodiment, the SKB includes problem descriptions and associated solutions relevant to the device which are navigable through visual as well as text searching. The user is assisted in navigating the SKB by exploring a visual representation of the device, such as a 3D representation. This removes the need for the user to find the correct terminology for the search.

A linking system provides "graphical" links (so called, herein, to distinguish them from solution links) between visualized components of the visual representation and the cases/solutions of the SKB. Each graphical link, when actuated, retrieves a case from the SKB corresponding to the visualized component to which it is linked. The building and maintaining of such a linking system by trained experts could be time intensive, particularly as devices are frequently updated. In addition, an expert-created linking system may not provide a mapping which is relevant to the users' understanding of and use of the visual representation for navigation. Accordingly, in the exemplary embodiment, the construction and refinement of the linking system is at least partially based on a collaborative method of linking visualized components of the device with relevant problem descriptions and associated solutions. Through this method, cases/solutions are classified according to the physical structure of the device and can therefore be navigated through the representation of that device.

The collaborative approach allows users of the SKB to contribute to the construction of such a mapping, which a) enables the mapping to conform with the users understandings of how cases/solutions relate to the physical device and their mapping in use and b) avoids the requirement for editors of the SKB to systematically specify such a mapping when editing the contents of the SKB. These two features—continuous editing by the user group, and the ability to ensure that the mapping conforms to 'navigation in use' provide advantages over an automatic approach to building such a mapping.

Figure 2:
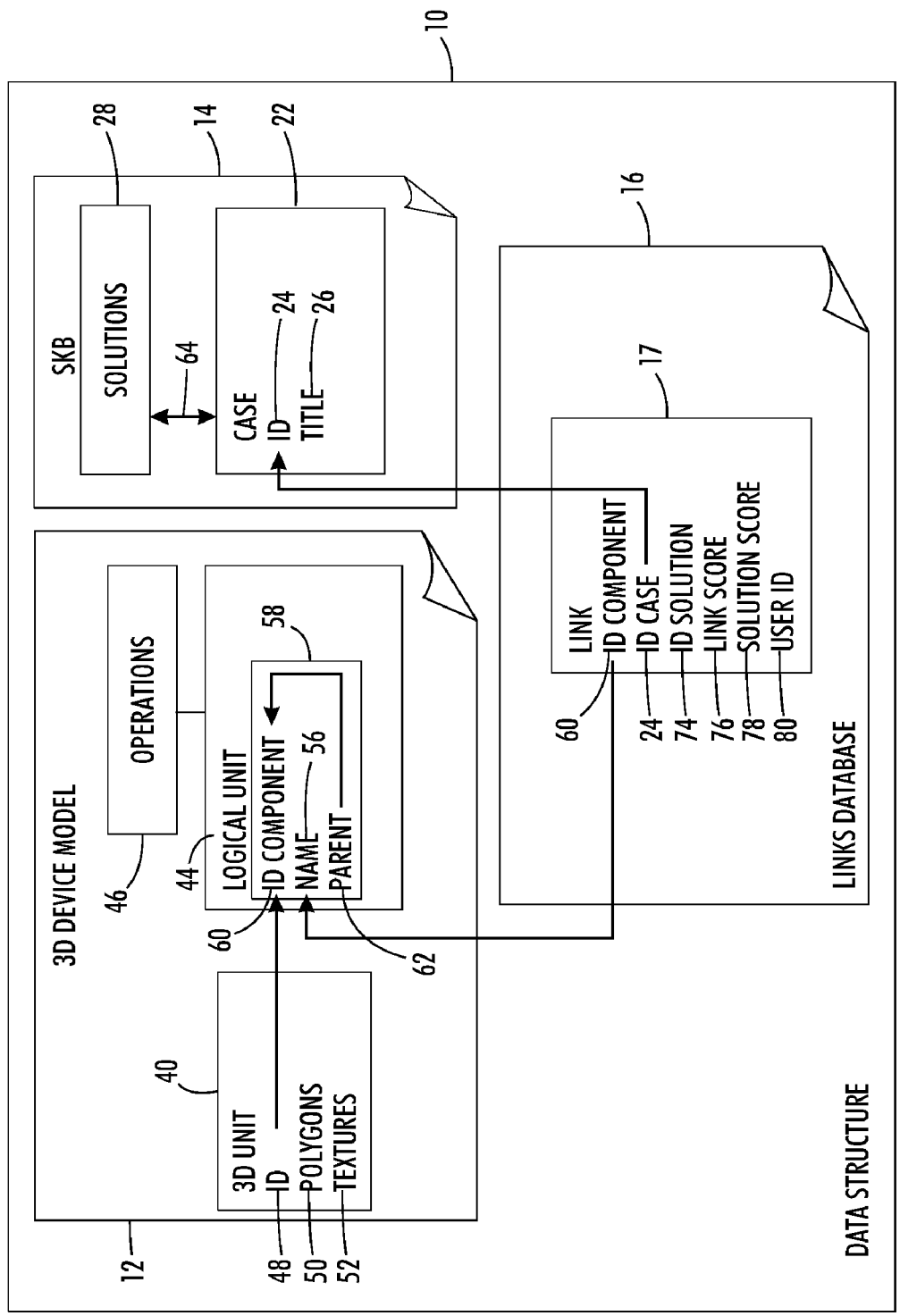
FIG. 2 illustrates a data model for the support system in which a searchable knowledge base is linked to a 3D device model by a links database.

FIG. 1 illustrates an exemplary support system 1 including a data model 10, which is shown in greater detail in FIG. 2. The exemplary data model 10 includes a visual representation generator in the form of a 3D device model 12, a searchable knowledge base (SKB) 14, of the type described above, and a links database 16, which stores graphical links 17 created between the device model 10 and the SKB 14. The data model 10 will first be described, followed by a description of a linking system which uses this data model 10 in order to support the creation of the graphical links and the navigation of the SKB through these links. As illustrated in FIG. 1, the data model 10 may be stored in data memory 18 of a computer 20, such as the exemplary server computer. However, it is to be appreciated that the data model 10 may be implemented in one or a plurality of communicatively linked computers.

As shown in FIG. 2, the SKB 14 may be in the form of a centralized repository of predefined problems and solutions for problem solving. The SKB contains a list of potential problems organized into cases 22, shown as each having an ID 24, which uniquely identifies the case, and a Title 26, which may be a problem statement. Each case 22 is associated with an ordered list of solutions 28 relevant for the type of physical device, such as multifunction device (MFD) 30 (FIG. 1) for which the device model 12 has been generated. As noted above, a case 22 can be considered as a description of a problem that occurs on the device 30 and a solution 28 can be considered as a list of steps to perform on the device in order to solve the case. Each linked solution 28 is one which can potentially fix the problem. This enables navigation of the cases/solutions, which are classified according to the physical structure of the device 30. The exemplary SKB 14 is a troubleshooting knowledge base. It is generally built by technical editors and made available to customers or troubleshooters of a device.

Figure 3:
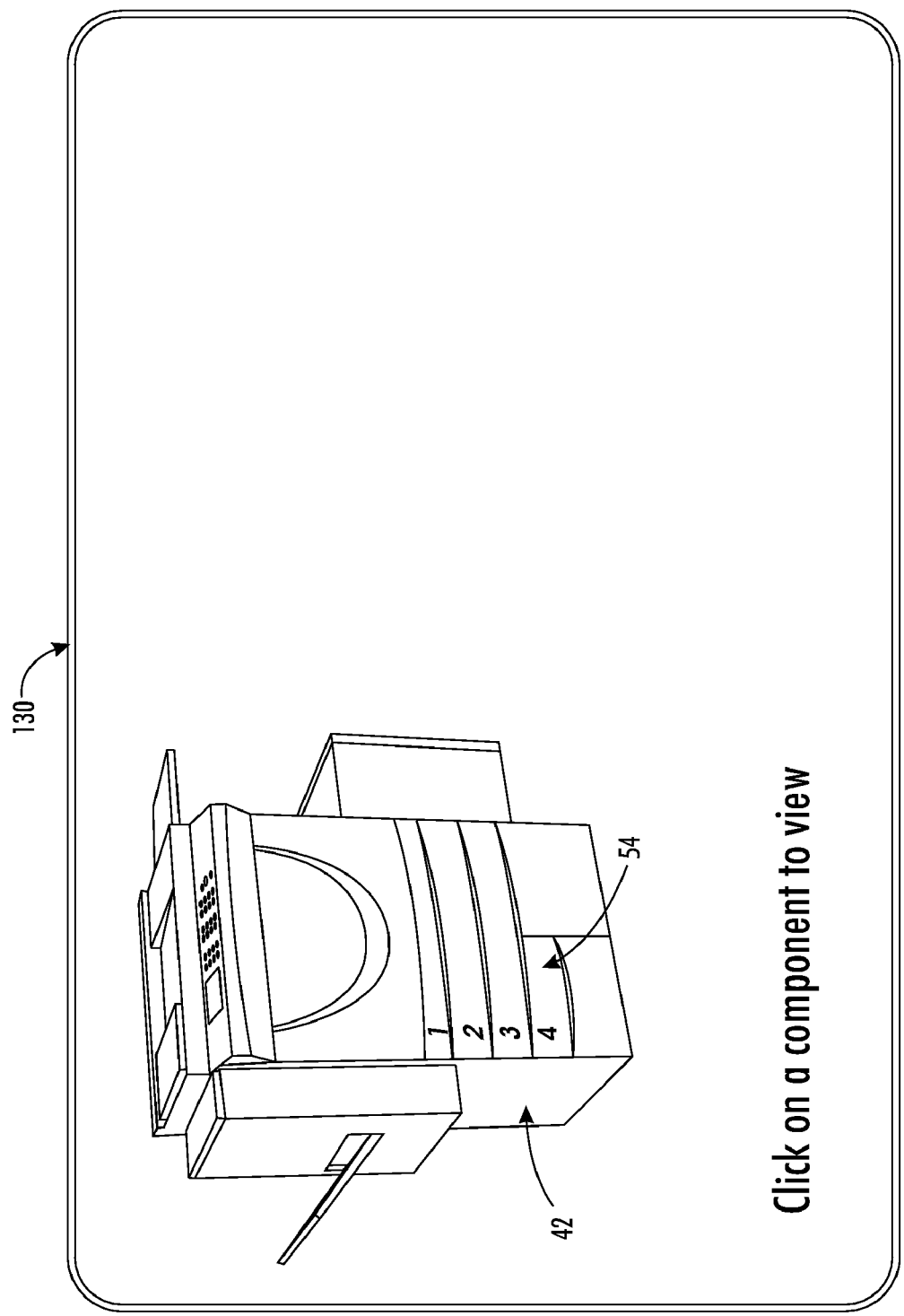
FIG. 3 illustrates a screenshot of a three dimensional visualization of a multifunctional device (MFD)

The illustrated 3D device mode 12 includes a 3D unit 40 which generates a 3D representation 42 (for example, as shown in FIG. 3) of the device 30 and its sub-components, an associated logical unit 44, which provides a hierarchy of the components illustrated in the model, and an operations unit 46, which defines all the permissible user interactions with the 3D representation, such as zooming, opening doors, pulling out trays, or other moving, rotating, or otherwise manipulating of components.

The 3D representation 42 includes at least the parts of the device 30 that will be visible or actionable by a user in the context of use and/or repair. In the case of an MFD 30, for example, such a representation 42 may include paper storage trays, access doors, moveable levers and baffles for accessing jammed sheets in the paper path, marking media replaceable containers, such as toner cartridges or ink containers, and waste toner receptacles, other replaceable items, such as photoreceptor belts and fuser roll heaters, finisher components, such as collection trays, stapling devices, and the like. As well as visualizing these components, the 3D representation 42 visualizes appropriate user actions, such as opening doors, turning levels, lifting baffles and so forth which may be used to access and/or repair a component. The 3D model can be based, for example, on COLLADA™ open source software. This software application is a 3D graphics description format based on XML. The computed 3D model can be rendered by a viewer, such as one based on Adobe™ Flash technology, which offers 3D capabilities and which may be extended with additional 3D libraries, such as PAPERVISION 3D™.

Where the 3D device model 12 is operative to create representations of more than one device, each may be associated in the 3D unit with its own unique ID 48. The 3D unit 40 also stores geometric shapes 50, such as polygons, circles, etc. from which the representation 42 is built, as well as textures 52 for recreating surfaces. The 3D representation 42 uses a collection of points in a 3D scene, which are connected by various geometric shapes, such as triangles, lines, curved surfaces, and the like. With other virtual objects such as texture, camera viewpoint and optionally the lighting involved in a 3D scene, the 3D representation unit 40 can provide a view in three dimensions (left-right, up-down and forward-backward), and allow manipulation of the 3D model 12 to give the user a realistic visual experience. The 3D representation 42 generally has several levels of view so that in a troubleshooting context, for example, the 3D model is navigable using different levels of detail. The inner parts of the model are not visible initially, but can be displayed as appropriate for navigation of the device. For example: a door will hide interior parts that will be revealed only when the door is opened and the particular area of the model is zoomed.

For example, FIG. 4 illustrates manipulation of the representation where a paper tray, exemplifying a 3D component

54, is shown opened. When a user clicks on the component 54, a floating menu 55, displaying the name 56 of the component, is displayed. When a user clicks on or otherwise actuates an icon 57 on the menu 55, cases and solutions already linked to that component are displayed, as shown at the right hand side of the screen in FIG. 4. For example, a ranked list of cases 22 is displayed for the component 54. When the user clicks on one of the cases (e.g., highlighted case number 6), titles of the linked solutions 28 for that case are displayed. If a user clicks on one of the solutions, further instructions related to that solution are displayed.

As illustrated in FIG. 2, the logical unit 44 stores a logical model 58 which is associated with a particular 3D Model and is based on the physical structure of the particular type of device 30. Logical model 58 describes hierarchically the logical representation of each physical component that is meaningful while using the device 30, e.g., in a troubleshooting context, those components that are accessible by a physical person facing the device. Each component may be referenced by its own unique ID 60, name 56, and its relationship to other components, e.g., by a reference to its parent 62. For example, in the logical model 58, each component/subcomponent 54 of the model 42 may be denoted by some or all of the following attributes:

1. Role: the purpose of the component in the device (e.g., storing paper).
2. ID 60 and Name 56: a unique identifier and a common name for the component (for example, tray1 may be the identifier for the common name, "lower tray" or "Tray 1").
3. Status: the status of the component in the real world (e.g.,: open for a tray or a door).
4. Permissible user interactions: any action that a user can perform on the physical component. Each user interaction is defined in operation unit 46
5. Dependency: the component may not be directly accessible and some other action might have to be performed before allowing access to the component, which is described in the dependency.
6. 3D movements: description for each possible action.

The logical model 58 can be considered itself as a hierarchical description of the 3D Model 42, where one component contains sub-components.

When a 3D model is to be loaded into a graphical representation 42, the corresponding logical model 58 is loaded by the logical unit 44 as well. It allows the system 1 to identify each virtual component 54 of the 3D model, to organize data and to build interactivity for each one of them.

The operations unit 46 of the 3D model 12 defines how the permissible user interactions on the components defined in the logical unit may be rendered as a transformation of the 3D unit geometry.

While the device model 12 is illustrated as a 3D device model, two dimensional representations of the device 30 are also contemplated.

The exemplary links database 16 is developed through a collaborative approach which uses the inputs of multiple users of respective physical devices 30, who are each trying to solve an actual problem with their device (troubleshooters). The users may be non-experts, such as customers and their employees, who may be located in many different locations who are dealing with different devices, or experts, such as service engineers called to the site of a device. Through interactions with these users over time, a mapping between the 3D model 12 of the actual device 30 and the SKB 14 is developed. The mapping is stored as a set of graphical links 17 in the links database 16. This collaborative approach allows the users of the SKB 14 to participate in the construction and the maintenance of the mapping by creating links 17 between the virtual device 12 and the existing SKB 14, as well as optionally also adding new solutions 28 and case/solutions links 64 to the SKB 14.

The exemplary graphical links 17 are shown as having the following information: the ID 60 of the component in the 3D device model 12, the ID 24 of the case 22 to which the component is linked, the ID 74 of a solution 28 for the case, a link score 76 for the link 17, a solution score 78 for the solution 28 (or where there is more than one solution, a score or ranking for each solution ID), and a user ID 80, which uniquely identifies the user that created the link 17. Each link 17 thus represents the association between a particular case 22 and a component 54 of the model, and/or a particular solution 28 of a particular case and a component 54 of the model. As will be appreciated, the link 17 need not contain all of this information and/or may contain additional information.

FIG. 1 illustrates other components of the interactive support system of which the data model 10 forms a part. A collaborative linking system 90 creates and maintains the links 17 stored in the links database 16. The exemplary linking system 90 may be in the form of software, hardware, or a combination thereof. The exemplary linking system 90 is in the form of software which is stored in main memory 92 of the server computer 20 or a communicatively linked separate computer. The software instructions forming the linking system 90 may be executed by a processor 94, such as a CPU, communicatively linked to the memory 92. The processor 94 also has access to the 3D device model 12, links database 16, and SKB 14 stored in data memory 18, which may be the same as or separate from memory 92. The exemplary linking system 90 includes a graphical link generator 96, for generating links 17 between the 3D model 12 and SKB 14, a solution link generator 97, for generating solution links 64 between solutions 28 and cases 22, a graphical links evaluator 98, for evaluating the links 17 and providing a link score 76, a solution link evaluator 100, for evaluating proposed new solution links 64 between cases 22 and solutions 28, and a logging component 102 which acquires and stores logs 104 of navigation sessions in which a user navigates the SKB 14 with the aid of the 3D device model 12. The links evaluators 98, 100 utilize the logs 104 or extracts therefrom in evaluating the usefulness of the links 17, 64 and ranking them. Components 96, 97, 98, 100, 102 may all be software components which may be combined or stored separately.

In various aspects, the usage rates of the established graphical links 17 and the success of the troubleshooting sessions using these links during users' navigations of the SKB 14 are captured by logging component 102 and stored in memory 18. Based on this information, scores 76 can be computed by component 98 for ranking the graphical links 17, and scores 78 computed by component 100 for ranking the solutions 28 that are attached to a case 22, in order to present the best solutions first to the users during navigation.

The links database 16 maintains dependencies (links 17) between the SKB cases/solutions and the device 3D unit 40 and logical unit 44. Each time a user of the system 90 chooses to associate a case 22 to one particular device component (or subcomponent) 54, a link 17 is stored in the database 16. The database 16 can then be consulted to retrieve the cases which are the most related to a device component. The score 76 for each graphical link 17 marks the confidence the system 90 has on the pertinence of that particular link.

The support system 1 further includes a search engine 106 for querying the SKB with a user query and facilitating user navigation of the knowledge base. A device status component 108 receives feedback from the device 30 concerning its status and provides input to the ranking component 100. The exemplary search engine and status component 108 may be software applications which may be stored in main memory 92, or elsewhere, and may be executed by a processor, such as processor 94. The exemplary computer processor 94 executes instructions for performing the automated steps of the exemplary method described below with reference to FIG. 5.

A data/control bus 110 links the various components 10, 90, 104, 106, 108 of the support system 1 with the processor 94 and with a communication interface 112. The communication interface 112 links the system 1 with one or more MFDs 30 having resident thereon a dedicated computer, or other computing devices, e.g., via the Internet. In particular, the communication interface 112 implements transmission and reception of various kinds of data to and from a computer-operable graphical user interface 120 associated with the device 30. Various kinds of data received by the communications interface 112 are stored in the memory 18.

With continued to FIG. 2, further details of the operating environment of the support system I will now be described. The graphical user interface 120 is communicatively linked with the server 20, and hence the collaborative linking system 1, via a wired or wireless link 122, e.g., via a network, such as the Internet. In the illustrated embodiment, the user interface 120 is incorporated into a multifunction device 30 or other electromechanical device, although it is also contemplated that the user interface may be located remote from the device 30. The user interface 120 can be implemented using a special purpose computer, a programmed microprocessor or microcontroller and any necessary peripheral integrated circuit elements, an ASIC or other integrated circuit, a hardwired electronic or logic circuit such as a discrete element circuit, a programmable logic device such as a PLD, PLA, FPGA or PAL, or the like, such as incorporated into a printer or a remote workstation of a computer network or other computer device such as a personal computer or mobile computer device, such as a PDA, a cell phone, a Tablet PC, a Pocket PC, or other suitable electronic device.

The illustrated user interface 120 includes a display 130, such as a screen which is configured for displaying the three dimensional model 42, or other visual representation, of the multifunction device 30, as illustrated in the screenshot in FIG. 3. A user may manipulate the visual representation 42 and interact with the system 1 through manipulation of an associated user input device 132, such as a keypad, keyboard touch screen, pointer, such as a mouse, track ball, pen, touch pad stylus, joystick, haptic interface, combination thereof, or the like. By manipulation of the user input device 132, a user can also enter a query as a text string as well as navigate the screens and other features of the graphical user interface, such as one or more of a toolbar, pop-up windows, scrollbars (a graphical slider that can be set to horizontal or vertical positions along its length), menu bars (a list of options, which may be used to initiate actions presented in a horizontal list), pull downs (a list of options that can be used to present menu sub-options), and other features typically associated with web browsers. The exemplary user input device 132 may be linked to a processor 134, which executes instructions stored in associated memory 136 for causing the display of the three dimensional model 42 and communication with the system 1 via a communication interface 138, such as a modem.

Memory 136 may represent any type of computer readable medium such as random access memory (RAM), read only memory (ROM), magnetic disk or tape, optical disk, flash memory, or holographic memory or combination thereof, as for memories 18 and 92.

Figure 5:
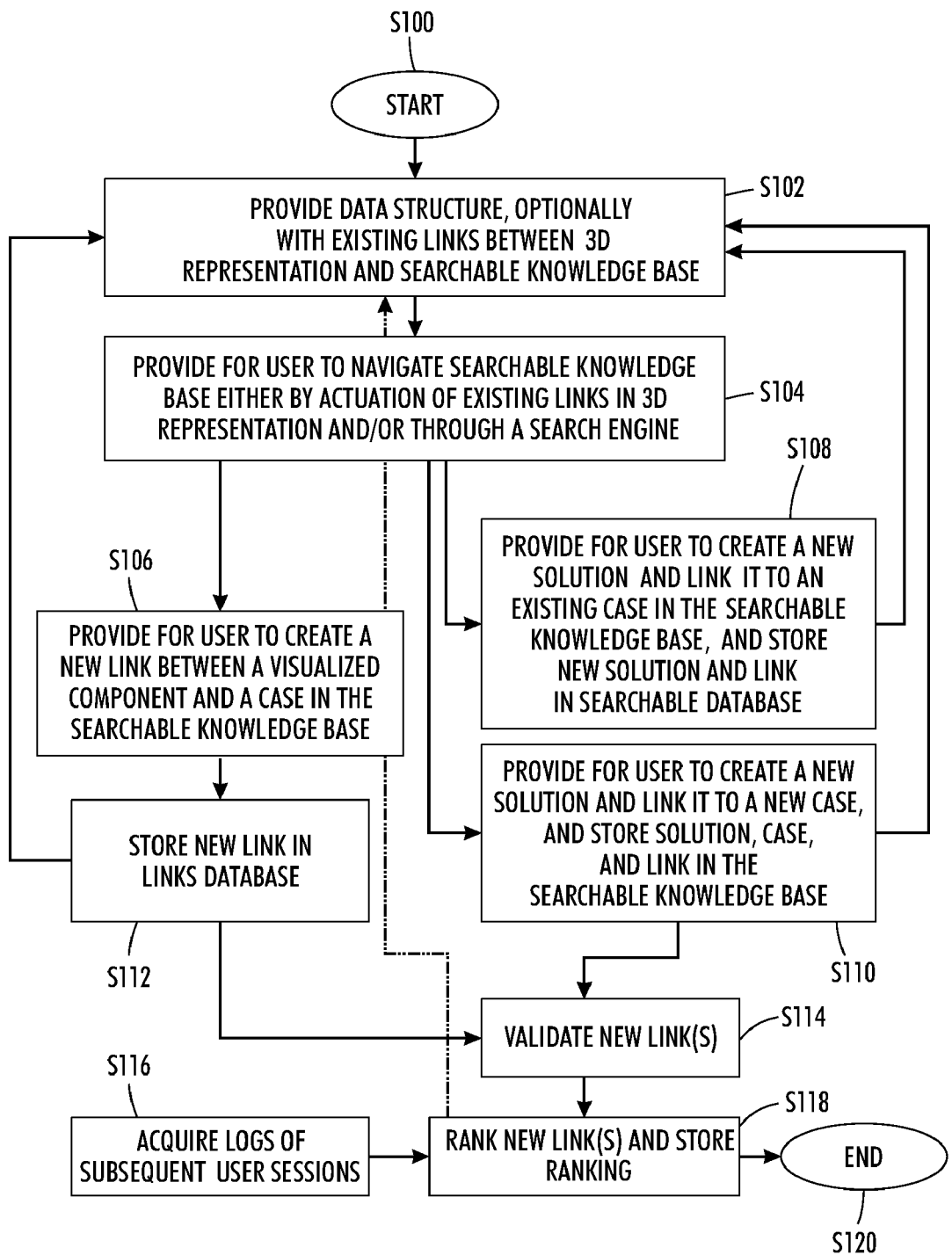
FIG. 5 illustrates an exemplary method.

FIG. 5 illustrates an exemplary method for populating and maintaining the links database and for enriching the SKB with new solutions and case/solutions links. The exemplary method includes mapping 3D components with KB entries. This involves creating links 17 between 3D components 42 and SKB contents 22, 28. The exemplary method is transformative in that it transforms the links database from a sparsely populated one to a more populated one. The method begins at S100.

At S102 a data structure 10 is provided. Initially, the data structure 10 may be composed of a SKB 14, with a list of predefined cases 22 and corresponding solutions 28, and the 3D device model 12. Some cases and solutions may also be already linked with the 3D model components via links 17, which may have been created by a system expert and stored in the links database 16.

At S104, provision is made for a user to navigate the SKB to identify a problem with a device and its solution. During this process, the user may review the 3D representation 42 and click on (or let the cursor hover over) one of its components 54. In response, the system 1 retrieves the name of the component from the logical unit 44 and shows it on the representation and, where a link 17 has previously been created, provides an actuable link 57 which takes the user to the linked case which may be displayed beside the representation, as shown in FIG. 4. Initially, there are few such links 17 and so the user may additionally or alternatively conduct a keyword or natural language search, optionally using the names of the components in formulating a query. The search engine 106 queries the knowledge base, based on the user's input query.

Provision is made for the user of the system 1 to populate the system with new links while using it. The possible types of enrichment include providing for the user to create a link 17 to a case already defined in the SKB (S106), to create a new solution and link it to an existing case by a link 64 (S108), to create a new case and solution, linking them together by a link 64, and linking them to a component 56 by a link 17 (S110). At S112 new links may be stored in the links database. At S114, the new link(s) 17, 64 created by the user may be validated. At S116, logs of subsequent user sessions with the system are acquired and stored in memory. At S118, the links 17, 64 may be ranked, based on an analysis of the logs. The method ends at S120. The method may be repeated with each new user of the system, updated, as appropriate, with the previously generated new links.

The method illustrated in FIG. 5 may be implemented in a computer program product that may be executed on a computer. The computer program product may be a tangible computer-readable recording medium on which a control program is recorded, such as a disk, hard drive, or the like. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge. Alternatively, the method may be implemented in an intangible medium, e.g., may be a transmittable carrier wave in which the control program is embodied as a data signal using transmission media, such as acoustic or light waves, such as those generated during radio wave and infrared data communications, and the like, or any other medium from which a computer can read and use.

The exemplary method may be implemented on one or more general purpose computers, special purpose computer (s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIG. 5, can be used to implement the method for creating links.

Further details on these steps are now discussed.

1. Creating a Link 30 with a Case 18 Already Defined in the SKB (S106)

This may involve the following substeps. At S106a, a user can find a case 22 in the SKB that is useful to solve a problem identified in a particular area of the device and that was not previously attached to the corresponding component of the logical unit 44. The user may, in this situation, decide to add a link between this case 22 and the logical component. At S106b, the linking system 90 receives the request for a link 30 to be created between a particular case 22 and a component 54 of the 3D model.

The system 90 can help the user to validate the pertinence of his choice in two ways. At S106c, the list of cases 22 already linked to the logical component 58 is presented (e.g., on computer operated GUI 120) in order to show how this case is similar to previous links. At S106d, a list of components 54 that have already been linked with cases similar to this one can be presented (e.g., on GUI 120) as potential alternative links.

The user finalizes his decision and selects one or more components to which he will attach the case 22. While creating the graphical link 17, the user can decide to have it as a private link (available only to him) or as a shared link (available to any user). The GUI provides a way for the user to input his selection. At S106e, the linking system 90 receives the user's input, and based thereon, the link generator 96 creates a new link 17 (S106f).

As a component 54 can contain other components, a case 22 that is attached to one component will automatically be attached to its parent component. All solutions that are related to that case will then be automatically associated to that component.

When a case 22 is already attached to a component 54, the user may wish to have it more specifically attached to a sub-component, e.g., because the user found it useful in order to distinguish it from other problems (cases) related to the global component. In a similar manner, the user can create a new link 17 with the sub-component and the case will appear not only when clicking on/viewing the parent component but also on the sub-component.

2. Creating a New Solution (S108)

When a user finds a new solution 28 to a particular case 22, he may want to add that solution to the case. A solution can be created by defining a set of actions to be performed in order to solve one problem. When a solution is retrieved from the SKB, it may contain images with textual information. For a new solution, the images to accompany the text can be created from the conversion of a sequence of actions recorded in the 3D device model. The solution link creator 97 adds the solution 28 and links it to a case by a link 64.

Step S108 may proceed as follows: If the case 22 is not yet attached to a component, at S108a, the system operates as in S106 to create a link 17.

At S108b, a user inputs a sequence of actions, either as a list of text, manipulations to the 3D representation, or combination thereof. The system receives the sequence of actions performed on the 3D model, which is converted into a SKB format and a new entry 28 is created in the solutions table.

At S108c, the new solution 28 is attached by a ink 64 to the selected case and thereby through link 17 to the logical components) 58.

3. Creating a Link with a New Case (S110)

A user may encounter and solve a problem that was not previously mentioned in the SKB 14.

The user may first go through the process described in S106. As a result the user may find, within the existing links 17, for the selected component 56 a case that is close enough to his problem. In this situation, the process becomes one of creating a new solution 28 to this case (as described in S108).

If there is no case 22 adequately describing this problem, the user enters a textual description for the new case 22 and a new case entry is created in the SKB by the system 90. The process of linking the case to a new or existing solution is then completed as described in S108.

4. Validation (S114)

The exemplary collaborative linking system 1 thus described can be used in different contexts by different types of users. One typical user could be an expert troubleshooter, supporting a customer over the phone from a call center. In this case the user will probably be knowledgeable enough to use the 3D device model for navigating the SKB and for creating new links and new content and sharing the results with his peers. Another typical user could be an end-user of the device 30, accessing the SKB 14 occasionally as an online resource for self support. In the latter case, the user will probably just navigate the SKB through the 3D device model. Depending on the context of deployment of such a system, in order to manage the consistency of the data model and especially the shared links 17, some restrictions or validation mechanisms may be added to the process.

Optionally, the new links 17 may be subject to a manual validation by an editor or authorized user of the system before the links are implemented and made available to all users (S114a). Some actions (creating a link, solution or case) could be available only to some users with corresponding privileges granted, e.g., all rights granted only to troubleshooters or creation/linking rights granted to troubleshooters and only inking rights granted to end-users.

Alternatively or additionally, the system 1 provides a collective way of validating the links. When a link has been created, all subsequent sessions using this link are monitored (S116) and both the usage rates of the links and the success of the session using these links are captured to compute a score 76 for the link at S118).

Ranking and Filtering of the SKB Elements (S118)

The cases listed for a given component can be ranked according to their score. The score of each link can be computed in part through the analysis of prior sessions where such links were used. The following scoring components can be used, singly or in combination:

1. The success rate of the link: this may be expressed as the number of sessions that were reported as successful by the users over the number of sessions where the link was used and the success information was reported (successful or not successful).

2. The usage of the link: this may be expressed as the number of times the link was used relative to the number of times all links related to the same component were used.

3. An additional component of the score can be the level of similarity found between the case and the component. This could be implemented, for example, through linguistic processing comparing the terminology of the component and of the terminology of the case.

Thus, the scoring may use both collective (user based) and system based scoring criteria. To compute an overall score, a weighted sum or other function of the three scores can be used.

Following the same principle, solutions 28 that are attached to one case 22 can be ranked in order to propose the best solutions first. Solutions shown to the user can be ranked according to collective and system criteria, as with the cases. As a solution can be part of several cases, the score will be different for a solution depending on the case and the component to which it is linked. For example when looking at component 1, the solution 1 of case 1 will be displayed, but if looking at component 2, the same solution 1 of case 2 may not be displayed in the first rank.

Finally, the ranking may be associated with some filtering based on the status of the device. In particular, if the 3D model is synchronized with the real device status (via device status component 108), the cases and solutions displayed can be filtered out automatically if they describe situations which are not compatible with the current status of the device. For example, some cases could be filtered out if they correspond to an optional component that is not activated on the device. U.S. Pub. No. 2008/0294423, incorporated by reference, provides exemplary methods for informing troubleshooting sessions with data from the device 22.

Guiding the User Through a Solution (S104)

As illustrated in FIG. 4, during the navigation, the hierarchical structure of the logical model 58 helps the user to find cases/information. The cases that are visible for each component correspond to the private links 17 that were previously created by this user and also the shared links 17 that were created by other users. The more in-depth the user enters into a model, the more specific the cases will be. Once a case is selected, the user will have access to a ranked list of solutions associated to this case. Finally, after having navigated the model, and when a solution is selected, the corresponding steps sequence, compatible with the interactions on the 3D model, is loaded in order to guide the user during his session to perform a full step by step solution on the 3D model. The main advantage of such a system is that a user does not have to know the exact name of the component or to enter any query in order to be prompted with solutions.

User Interaction

Examples of the user navigation of the SKB through the 3D device model and of the creation of new links will now be described.

1. Navigating the SKB Through the 3D Device Model

As previously noted, each 3D component 54 is initially or progressively linked with one or more cases in the SKB 14. A user views the 3D representation on the GUI 120. A 3D component 54 is highlighted when the user activates the particular area of the screen, e.g., by moving the mouse cursor over it. A floating menu 55 may be contemporaneously displayed adjacent the component, as shown in FIG. 4.

The floating menu 55 may include a number of actuable items, such as icons 57, 140. Each icon of the floating menu represents a different type of interaction available. For example, one of the icons 57 indicates the availability of linked cases from the SKB 14. This icon will be hidden when no links are available for the component. When this icon is actuated, a solutions/cases list 144 is located besides the main 3D view 42. It is used for displaying all the linked cases and solutions from the SKB. The cases in the list are renewed automatically when the user selects one 3D component 54 or selects the icon 57 on the floating menu for displaying linked cases. The user can also browse the list by clicking on one case or go to an upper level, by navigating the SKB, as in a collapsible and expandable web browsing menu. The detail of each solution is shown when the user clicks on one solution.

As will be appreciated, a 3D component may contain sub-components hierarchically. In that case, the system can load another 3D model to represent the sub-components in detail. Users can double-click on, or otherwise actuate, the currently highlighted 3D component to get a more detailed view. Once the new 3D model is loaded, it may highlight all its own sub-components for several seconds to notify the user the availabilities of linked cases from the SKB.

2. Creation of New Links

Figure 6:
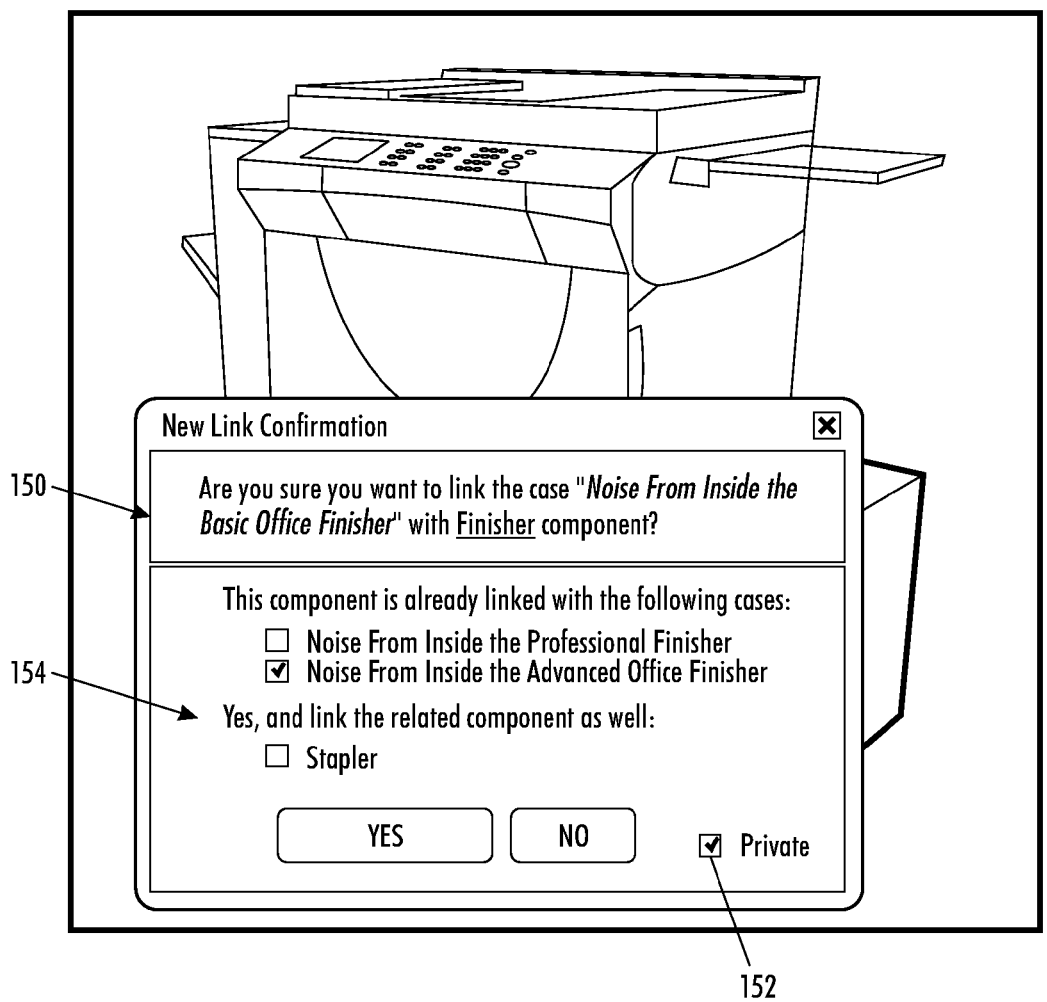
FIG. 6 is a screenshot illustrating creation by a user of a link between a virtual component and a case in the knowledge base.

As discussed for step S106, components can be linked with the SKB cases/solutions manually. A user can do this by dragging and dropping an existing case from the displayed list onto a displayed 3D component 54. A dialog box 150 is then presented to the user to validate the link 17, as shown in FIG. 6. Then this case and its related solutions will be attached to that 3D component, as well as the parent components. The dialog box gives the user the opportunity of creating the link as a private link by checking a box 152. The user is also provided with the opportunity to create a link to related components as illustrated at 154.

3. Creation of New Solutions

Figure 7:
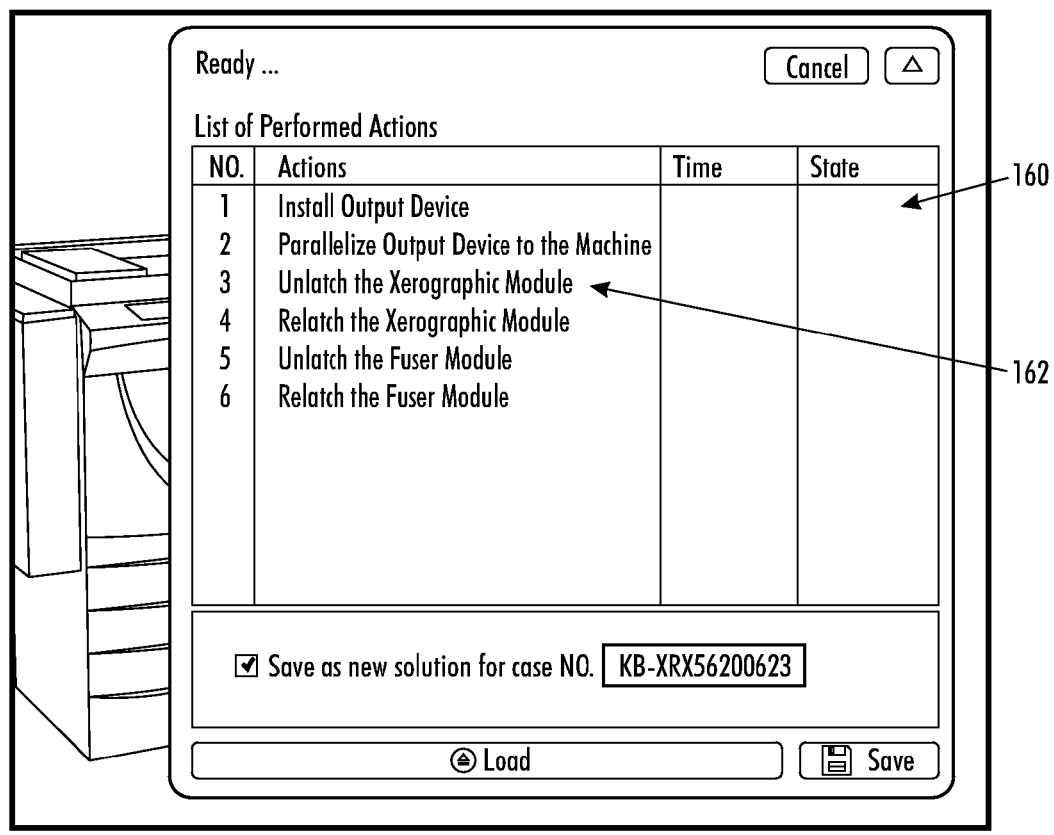
FIG. 7 is a screenshot illustrating creation by a user of a new solution to an existing case.

When the user has found a new solution, the user presses an icon on the floating menu. The system can help to record the sequence of steps and attach the sequence to a case. A drop down box 160 appears and the user enters the steps into a solution sequence 162, e.g., by typing on the computer keyboard, as shown in FIG. 7. A selected case may be attached by giving its case ID.

4. Creation of New Cases

The user can select a 3D component and press an icon 140 to attach a new case (FIG. 4). This brings a dialog box similar to the one shown in FIG. 6 for creating new links but in this instance, the case title can be edited.

The exemplary system and method provide advantages over prior systems. First, the 3D device representation 42 creates a way to navigate an existing SKB 14, i.e., the content is specific to the support activity and is created independently from the navigation mechanism. Second, a collaborative method is proposed in order to create the links that will enable the navigation.

By providing an easier and more effective way for users to navigate an SKB 14, the cost of servicing of machines 30 can be reduced. The system 1 can be a more productive tool for both call center operators and customers to improve the troubleshooting process and troubleshooting sessions. In one embodiment, a call center operator and a user share a visualization of the 3D representation, allowing the call center to participate in the troubleshooting. By providing a way to build a system which provides a visual way to allow customers and troubleshooters to navigate a SKB, it can improve the usability of 3D troubleshooting by facilitating the information retrieval and provide a more natural way of representation to users. The links database created by experts, troubleshooters and also by customers can be help in capturing knowledge about troubleshooting solutions and thus support call center troubleshooters when helping customers on the phone and customers when self troubleshooting.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for developing a support system comprising:
   generating a virtual representation of a device for display on a user interface;
   storing existing links between components of the virtual representation, which represent components of the device, and corresponding cases in a searchable knowledge base stored in computer memory, the searchable knowledge base including a list of potential problems organized into cases, wherein the cases in the knowledge base are each attached to at least one solution by a solution link;
   providing for a user trying to solve an actual problem with the device to navigate the knowledge base in search of a solution to a problem with the device with the assistance of the virtual representation which enables actuation of the existing links and, where a link between a component of the virtual representation and a case in the searchable knowledge base does not exist, providing for the user to create a new link, each new link linking a component of the virtual representation with a case in the knowledge base which the user identifies as providing a solution to the problem with the device which is related to the component; and
   storing the new link in computer memory, whereby a user navigating the knowledge base in search of a solution to a problem with a device with the assistance of the virtual representation is able to access the new link.

2. The method of claim 1, further comprising providing for the new link to be validated by an expert prior to storing the new link with the existing links.

3. The method of claim 1, further comprising automatically creating a new link between the user-identified case and a parent component of the newly linked component.

4. The method of claim 1, wherein each linked component includes a plurality of stored attributes selected from the group consisting of:
   the component's role in the device;
   a unique identifier for the component;
   a common name for the component;
   a status of the component in the device;
   permissible user interactions on the component;
   an action to be performed before allowing access to the component; and
   a description for each possible action on the component.

5. The method of claim 1, further comprising at least one of:
   presenting a list of cases that are already linked to the component in order to show how the case proposed to be linked is similar to previous links; and
   presenting a list of components that are already linked with cases similar to the case proposed to be linked as potential alternative links.

6. The method of claim 1, further comprising ranking the new link, wherein the ranking is based at least in part on a measure of how successful the link is in subsequent user sessions which include navigating the knowledge base in search of a solution to a problem with the device.

7. The method of claim 1, further comprising logging user sessions which include navigating the knowledge base in search of a solution to a problem with the device to evaluate the new link.

8. The method of claim 1, wherein the creation of the new link includes providing for the user to drag and drop a visual representation of the case on the component in the virtual representation to which it is to be linked.

9. A method for developing a support system comprising:
   generating a virtual representation of a device for display on a user interface;
   storing existing links between components of the virtual representation, which represent components of the device, and corresponding cases in a searchable knowledge base stored in computer memory;
   providing for a user to navigate the knowledge base in search of a solution to a problem with the device with the assistance of the virtual representation which enables actuation of the existing links and, where a link between a component of the virtual representation and a case in the searchable knowledge base does not exist, providing for the user to create a new link, each new link linking a component of the virtual representation with a case in the knowledge base which the user identifies as providing a solution to the problem with the device which is related to the component;
   providing for the user to specify the new link as a private link which is not accessible to all users; and
   storing the new link in computer memory, whereby the user, when navigating the knowledge base in search of a solution to a problem with a device with the assistance of the virtual representation, is able to access the new link.

10. The method of claim 1, further comprising providing for the user to create a new solution link between an additional solution and the case to which the component is linked, and adding the new solution link to the knowledge base.

11. The method of claim 1, wherein the method comprises providing for the user to create a new solution to an existing case, the solution including a series of steps, at least one of the steps being associated with an image derived from the virtual representation, and adding the new solution to the knowledge base.

12. The method of claim 1, further comprising storing a logical structure of the components displayed in the virtual representation, and causing the name of a component to be displayed when a user actuates an area of a screen in which the component of the virtual representation is displayed.

13. The method of claim 1, further comprising:
    causing the virtual representation of the device to be displayed on a user interface; and
    providing actuable links on the virtual representation, each actuable link linking a component of the device model displayed in the virtual representation with at least one case in the knowledge base, when actuated by a user manipulating the user interface, the actuable link causing at least one of the at least one case to be displayed on the user interface.

14. The method of claim 9, wherein the cases in the knowledge base are each attached to at least one solution by a solution link.

15. A method for developing a support system comprising:
    generating a virtual representation of a device for display on a user interface;
    storing existing links between components of the virtual representation, which represent components of the device, and corresponding cases in a searchable knowledge base stored in computer memory;
    providing for a user to navigate the knowledge base in search of a solution to a problem with the device with the assistance of the virtual representation which enables actuation of the existing links and, where a link between a component of the virtual representation and a case in the searchable knowledge base does not exist, providing for the user to create a new link, each new link linking a component of the virtual representation with a case in the knowledge base which the user identifies as providing a solution to the problem with the device which is related to the component;

storing the new link in computer memory, whereby a user, when navigating the knowledge base in search of a solution to a problem with a device with the assistance of the virtual representation, is able to access the new link; and ranking the new link, wherein the ranking is based at least in part on a measure of how successful the new link is in subsequent user sessions which include navigating the knowledge base in search of a solution to a problem with the device.

16. A computer program product comprising a non-transitory recording medium encoding instructions, which when executed on a computer causes the computer to perform the method of claim 1.

17. A support system comprising memory which stores instructions for performing the method of claim 1 and a processor in communication with the memory for executing the instructions.

18. The support system of claim 17, further comprising: computer memory which stores:

a 3D device model for generating a virtual representation of a device for display on a user interface, and a links database which stores the existing links between components of the virtual representation, which represent components of the device, and corresponding cases in an associated searchable knowledge base.

19. The system of claim 18, wherein the 3D device model includes a logical unit which stores a hierarchy of the components in the device whereby, when a new link is created by the user, a link is also created between a parent of the component and the case.

20. The system of claim 18, further comprising a link evaluator which ranks the new link based on information acquired during subsequent user navigations of the knowledge base which utilize the link.

21. The system of claim 18, further comprising a logging component which logs user navigations of the knowledge base.

22. The system of claim 18, wherein the system is hosted by a server computer and wherein the server computer is communicatively linked to a user interface which is configured for displaying the visual representation and actuable links for retrieving and displaying linked cases.

\* \* \* \* \*